(12) United States Patent
Perreault et al.

(10) Patent No.: US 10,546,518 B2
(45) Date of Patent: Jan. 28, 2020

(54) NEAR-EYE DISPLAY WITH EXTENDED EFFECTIVE EYEBOX VIA EYE TRACKING

(71) Applicant: GOOGLE LLC, Mountain View, CA (US)

(72) Inventors: John D. Perreault, Mountain View, CA (US); Patrick Llull, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/595,147

(22) Filed: May 15, 2017

(65) Prior Publication Data
US 2018/0330652 A1 Nov. 15, 2018

(51) Int. Cl.
*G09G 3/02* (2006.01)
*H04N 5/225* (2006.01)
(Continued)

(52) U.S. Cl.
CPC ............ *G09G 3/02* (2013.01); *G02B 27/0075* (2013.01); *G02B 27/0172* (2013.01); *G06F 3/013* (2013.01); *G06T 3/20* (2013.01); *G06T 3/40* (2013.01); *G06T 7/70* (2017.01); *G09G 3/003* (2013.01); *H04N 5/2254* (2013.01); *H04N 5/33* (2013.01); *G02B 2027/0123* (2013.01);
(Continued)

(58) Field of Classification Search
CPC ........ G02B 27/0093; G02B 2027/0138; G02B 2027/014; G02B 27/017; G06F 3/013; G06F 3/011; G06F 3/0346; G06T 19/006; G06T 7/70; G06T 7/215; A61B 3/113; A61F 2009/00848; H04N 13/383; H04N 13/332; H04N 13/344
See application file for complete search history.

(56) References Cited

U.S. PATENT DOCUMENTS 8,487,838 B2 7/2013 Lewis et al.
9,841,537 B2 12/2017 Luebke et al.
(Continued)

FOREIGN PATENT DOCUMENTS

TW 201643506 A 12/2016
WO WO-2016086742 A1 * 6/2016 ............. G02B 27/01

OTHER PUBLICATIONS

International Search Report and Written Opinion dated May 7, 2018 for PCT Application No. PCT/US2018/017590, 20 pages.
(Continued)

*Primary Examiner* — Sultana M Zalalee

(57) ABSTRACT

A near-eye display system includes a display panel to display a near-eye lightfield frame comprising an array of elemental images and an eye tracking component to track a pose of a user's eye. The system further includes a rendering component to position the array of elemental images within the near-eye lightfield frame based on the pose of the user's eye. A method of operation of the near-eye display system includes determining, using the eye tracking component, a first pose of the user's eye and determining a shift vector for an array of elemental images forming a near-eye lightfield frame based on the first pose of the user's eye. The method further includes rendering the array of elemental images at a position within the near-eye lightfield frame that is based on the shift vector.

17 Claims, 7 Drawing Sheets

(51) Int. Cl.

| | | |
|---|---|---|
| *G02B 27/01* | (2006.01) | |
| *H04N 5/33* | (2006.01) | |
| *G02B 27/00* | (2006.01) | |
| *G06F 3/01* | (2006.01) | |
| *G06T 7/70* | (2017.01) | |
| *G06T 3/20* | (2006.01) | |
| *G06T 3/40* | (2006.01) | |
| *G09G 3/00* | (2006.01) | |
| *H04N 13/383* | (2018.01) | |
| *H04N 13/31* | (2018.01) | |
| *G06T 19/00* | (2011.01) | |

(52) U.S. Cl.
CPC .. *G06T 19/006* (2013.01); *G06T 2207/20228* (2013.01); *H04N 13/31* (2018.05); *H04N 13/383* (2018.05)

(56) References Cited

U.S. PATENT DOCUMENTS

| | | | | |
|---|---|---|---|---|
| 2002/0181115 | A1* | 12/2002 | Massof | G02B 27/017 359/630 |
| 2004/0207635 | A1 | 10/2004 | Miller et al. | |
| 2006/0256219 | A1 | 11/2006 | Schroderus | |
| 2007/0216867 | A1 | 9/2007 | Campbell et al. | |
| 2012/0068916 | A1* | 3/2012 | Tsubata | G02F 1/1362 345/94 |
| 2012/0274734 | A1* | 11/2012 | Byers | H04N 7/144 348/14.16 |
| 2013/0050432 | A1* | 2/2013 | Perez | G02B 27/017 348/47 |
| 2013/0207887 | A1 | 8/2013 | Raffle et al. | |
| 2013/0285885 | A1 | 10/2013 | Nowatzyk et al. | |
| 2014/0145939 | A1* | 5/2014 | Herold | G02B 27/017 345/156 |
| 2014/0362110 | A1 | 12/2014 | Stafford | |
| 2015/0015814 | A1* | 1/2015 | Qin | G02B 27/2214 349/13 |
| 2015/0185475 | A1 | 7/2015 | Saarikko et al. | |
| 2015/0312560 | A1* | 10/2015 | Deering | G02B 13/0085 345/1.3 |
| 2016/0091720 | A1 | 3/2016 | Stafford et al. | |
| 2016/0209647 | A1 | 7/2016 | Fursich | |
| 2016/0313558 | A1* | 10/2016 | Gutierrez | G09G 3/02 |
| 2016/0320620 | A1 | 11/2016 | Maimone | |
| 2016/0379606 | A1* | 12/2016 | Kollin | G02B 27/0093 345/428 |
| 2017/0038590 | A1 | 2/2017 | Jepsen | |
| 2017/0038834 | A1 | 2/2017 | Wilson et al. | |
| 2017/0205877 | A1* | 7/2017 | Qin | G02B 27/01 |
| 2017/0269367 | A1* | 9/2017 | Qin | G02B 27/01 |

OTHER PUBLICATIONS

Lanman, et al., "Near-Eye light field displays," ACM Transactions on Graphics (TOG), ACM, US, vol. 32, No. 6, Nov. 1, 2013, XP0508033862, ISSN:07030-0301, DOI:10.1145/2508363. 2508366, 10 pages.
International Search Report and Written Opinion dated May 18, 2018 for PCT Application No. PCT/US2018/022440, 13 pages.
U.S. Appl. No. 15/917,375, filed Mar. 9, 2018, listing John D. Perreault (et al.) as inventors, entitled, "Near-Eye Display With Frame Rendering Based on Reflected Wavefront Analysis for Eye Characterization", 47 pages.
Wikipedia, <https://en.wikipedia.org/wiki/Shack%E2%80% 93Hartmann_wavefront_sensor>, Accessed Mar. 15, 2017, 2 pages.
Maimone, A., et al., "Pinlight Displays: Wide Field of View Augmented Reality Eyeglasses using Defocused Point Light Sources", ACM Trans. Graph., 33, 4, Article 89, Jul. 2014, 11 pages.
Zhang, S., "The Obscure Neuroscience Problem That's Plaguing VR", <https://www.wired.com/2015/08/obscure-neuroscience-problem-thats-plaguing-vr/>, Accessed May 15, 2017, 5 pages.
Patney, A., et al., "Towards Foveated REndering for Gaze-Tracked Virtual Reality", NVIDIA, ACM Trans. Graph., vol. 35, No. 6, Article 179, Nov. 2016, 12 pages.
Pfeiffer, T., et al, "Evaluation of Binocular Eye Trackers and Algorithms for 3D Gaze Interaction in Virtual Reality Environments", Journal of Virtual Reality and Broadcasting, No. 16, May 2008, 13 pages.
Taiwanese Office Action dated Nov. 28, 2018 for corresponding TW Application No. 107109327, 3 pages.
International Preliminary Report on Patentability dated Sep. 13, 2018 for PCT Application No. PCT/US2018/022440, 6 pages.
Boston Micromachines Corporation, "Adaptive Optics 101: Overview, Tech Review & Applications Introduction and Motivation," Shaping Light Blog, Technical whitepaper; accessed Sep. 12, 2018 «https:// blog.bostonmicromachines.com/hs-fs/hub/1703/ . . . /ao_ 101_white_paper.pdf»; 12 pages.
Pamplona, V. et al., "NETRA: Interactive Display for Estimating Refractive Errors and Focal Range," Proc. of SIGGRAPH Jan. 2010; Artcle No. 77; 8 pages.
Thibos, Larry N. "Principles of Hartmann-Shack Aberrometry," Journal of Refractive Surgery, vol. 16; Sep./Oct. 2000; 3 pages.
Wyant, J. et al. "Chapter 1: Basic Wavefront Aberration Theory for Optical Metrology," Applied Optice and Optical Engineering, vol. XI; Jan. 1992, ISBN 0-12-408611-X; 13 pages.
Written Opinion of the International Preliminary Examining Authority dated Jan. 18, 2019 for corresponding International Application No. PCT/US2018/017590, 5 pages.
English translation of Taiwanese Office Action dated Jan. 28, 2019 for corresponding TW Application No. 107105857, 13 pages.
Notice of Allowance dated Sep. 26, 2019 for U.S. Appl. No. 15/917,375, 8 pages.

* cited by examiner

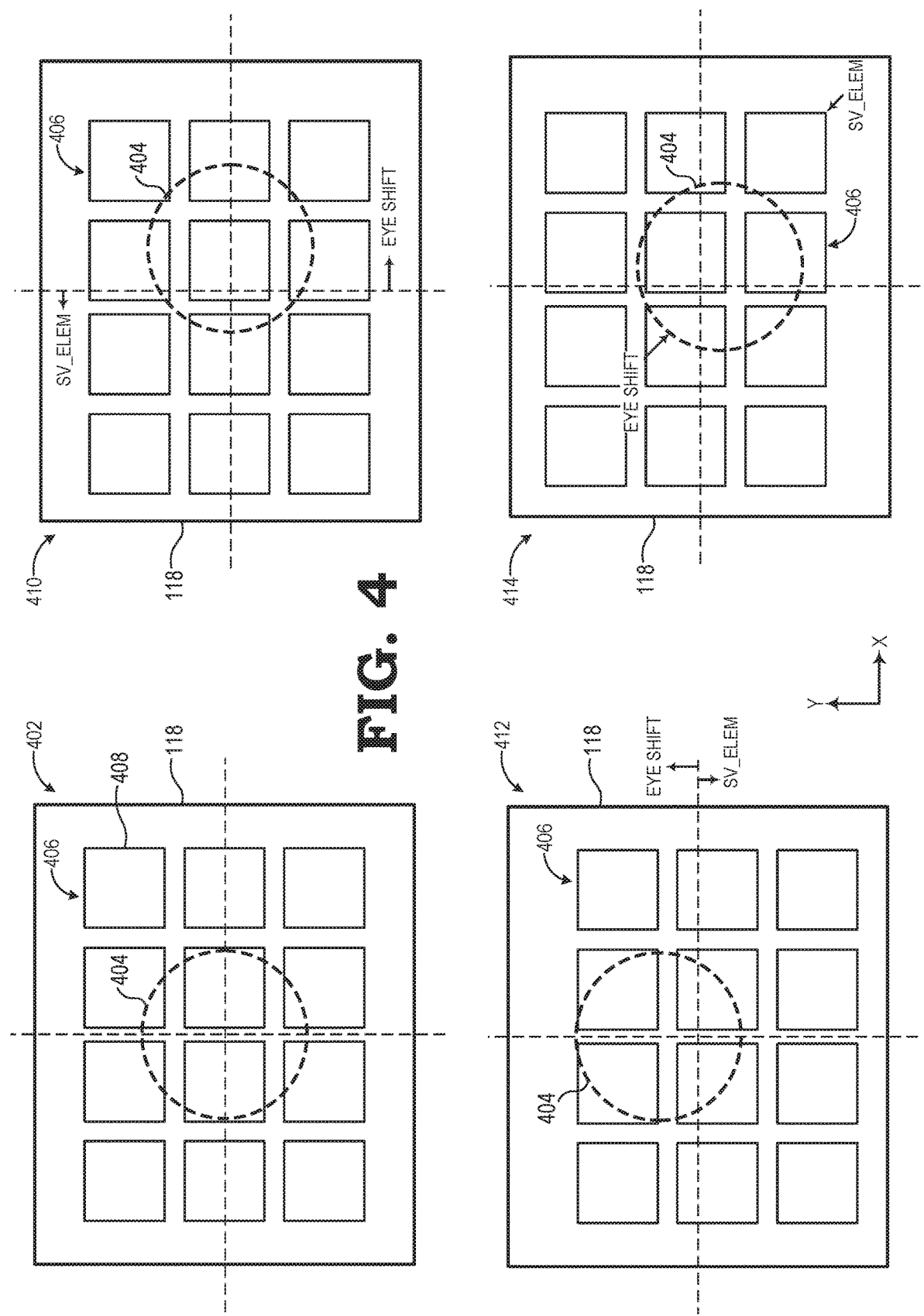

NEAR-EYE DISPLAY WITH EXTENDED EFFECTIVE EYEBOX VIA EYE TRACKING

BACKGROUND

Field of the Disclosure

The present disclosure relates generally to near-eye displays and, more particularly, to improvement of effective eye-box size in near-eye displays.

Description of the Related Art

Head-mounted displays (HMDs) and other near-eye display systems can utilize a near-eye lightfield display or other computational display to provide effective display of three-dimensional (3D) graphics. Generally, the near-eye lightfield display employs one or more display panels and an array of lenslets, pinholes, or other optic features that overlie the one or more display panels. A rendering system renders an array of elemental images, with each elemental image representing an image or view of an object or scene from a corresponding perspective or virtual camera position. Such near-eye lightfield displays typically exhibit a tradeoff between eyebox size and field of view (FOV) as eyebox size is proportional to the ratio of eye relief to lenslet focal length. Thus, to provide satisfactory FOV, a conventional near-eye display system employing an near-eye lightfield display typically has a relatively limited eyebox, which often is problematic in view of the variability of inter-pupillary distance (IPD) among the population of potential users and the variability in accurate positioning of a user's eye relative to the display, either of which can result in a user's pupil falling outside of the boundaries of the eyebox and thus resulting in occlusion of at least a portion of the imagery intended to be displayed to the user's eye.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a diagram illustrating additional examples of dynamic eyebox adjustment based on eye pose in accordance with some embodiments.

DETAILED DESCRIPTION

FIGS. 1-9 illustrate example methods and systems for dynamic eyebox adjustment based on user eye pose in a near-eye display system. In at least one embodiment, the near-eye display system employs a computational display to display near-eye lightfield frames of imagery to a user so as to provide the user with an immersive virtual reality (VR) or augmented reality (AR) experience. Each near-eye lightfield frame is composed of an array of elemental images, with each elemental image representing a view of an object or scene from a different corresponding viewpoint. An array of lenslets overlies the display panel and operates to present the array of elemental images to the user as a single autostereoscopic image.

As the eyebox dimensions, or "size", for the computational display are proportional to the ratio of eye relief to lenslet focal length, an attempt to increase eyebox size generally results in reduced field of view (FOV), and vice versa. To provide improved eyebox size without a corresponding reduction in FOV, in at least one embodiment the near-eye display systems described herein utilize a dynamic eyebox technique wherein an eye tracking component is utilized to determine the pose (position and/or rotation) of the user's eye and, based on this pose, determine a shift vector by which the array of elemental images is to be shifted relative to the near-eye lightfield frame in which they are incorporated (that is, relative to the display surface of the display panel) so as to effectively shift the eyebox of the computational display so as to accommodate the pose of the user's eye. As an example, a default position for an array of elemental images on the display panel may be specified for a default assumed pose of the user's eye. However, should the user's eye deviate from this default pose, the near-eye display system compensates for the deviated pose by introducing one or both of: (1) a corresponding shift in the position of the array of elemental images from the default position to accommodate for a shift in the pose of the user's eye in the plane parallel to the display panel (that is, the X-Y plane) or (2) a corresponding scaling in the size of the elemental images of the array to accommodate for a shift in the pose of the user's eye along the axis perpendicular to the display panel (that is, the Z-axis). As the shift in the position of the array of elemental images and/or the scaling of the elemental images effectively shifts the direction of projection of the elemental images via the lenslet array, the shift in position of the array of elemental images effectively shifts the eyebox. Thus, dynamically shifting/scaling the elemental image array responsive to shifts in the pose of the eye in the user effectively provides a "larger" eyebox without requiring a corresponding reduction in the FOV of the near-eye display system.

Figure 1:
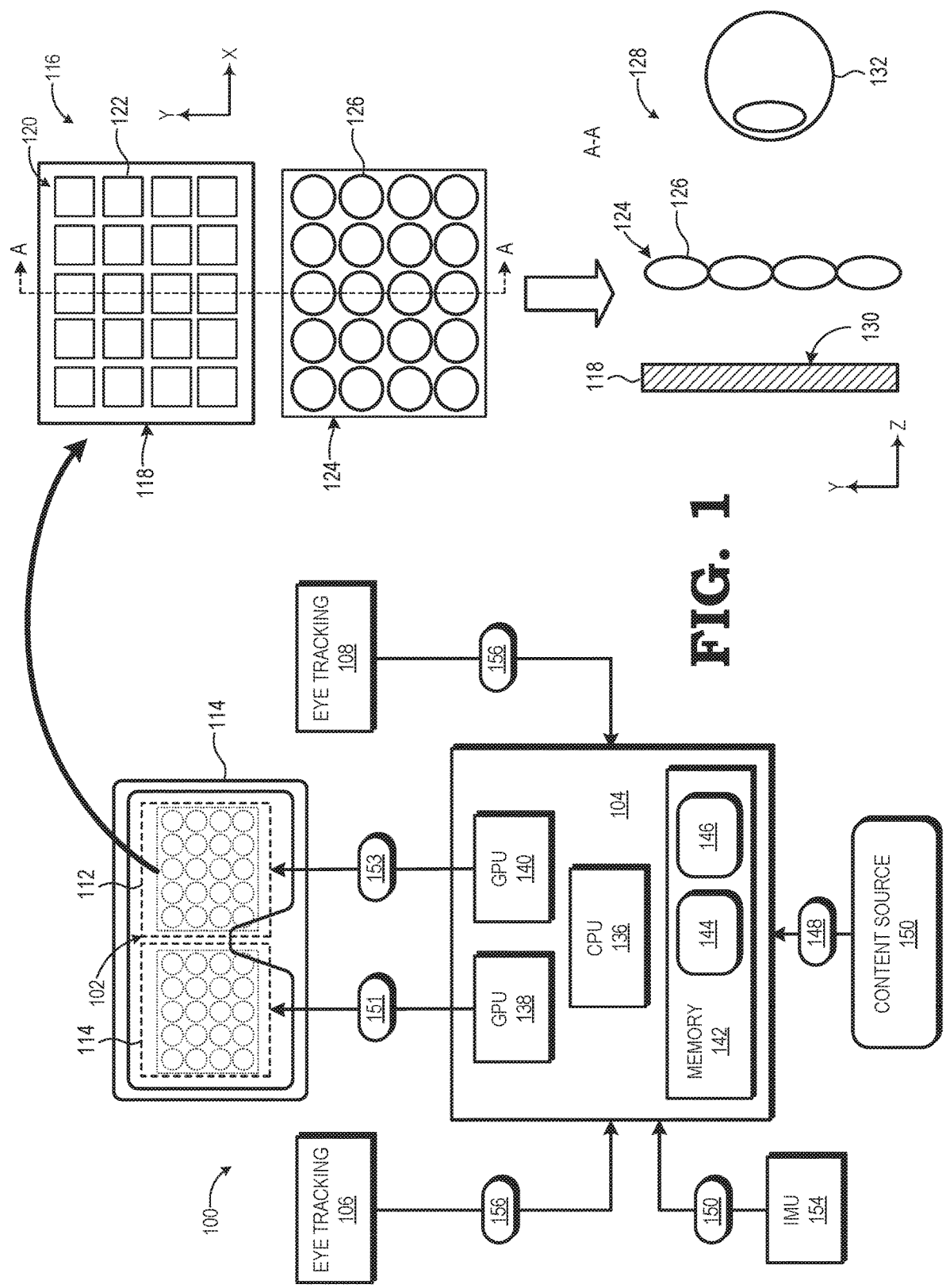
FIG. 1 is a diagram illustrating a near-eye display system employing eye tracking and corresponding elemental image shifting to provide dynamic eyebox adjustment in accordance with some embodiments.

FIG. 1 illustrates a near-eye display system 100 incorporating dynamic eyebox position adjustment in accordance with at least one embodiment. In the depicted example, the near-eye display system 100 includes a computational display sub-system 102, a rendering component 104, and one or more eye tracking components, such as one or both of an eye tracking component 106 for tracking a user's left eye and an eye tracking component 108 for tracking the user's right eye. The computational display sub-system 102 includes a left-eye display 110 and a right-eye display 112 mounted in an apparatus 114 (e.g., goggles, glasses, etc.) that places the displays 110, 112 in front of the left and right eyes, respectively, of the user.

As shown by view 116, each of the displays 110, 112 includes at least one display panel 118 to display a sequence or succession of near-eye lightfield frames (hereinafter, "lightfield frame" for ease of reference), each of which comprises an array 120 of elemental images 122. For ease of reference, an array 120 of elemental images 122 may also be referred to herein as a lightfield frame 120. Each of the displays 110, 112 further includes an array 124 of lenslets 126 (also commonly referred to as "microlenses") overlying the display panel 118. Typically, the number of lenslets 126 in the lenslet array 124 is equal to the number of elemental images 122 in the array 120, but in other implementations the number of lenslets 126 may be fewer or greater than the number of elemental images 122. Note that while the example of FIG. 1 illustrates a 5×4 array of elemental images 122 and a corresponding 5×4 array 120 of lenslets 126 for ease of illustration, in a typical implementation the number of elemental images 122 in a lightfield frame 120 and the number of lenslets 126 in the lenslet array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 128 of FIG. 1 depicts a cross-section view along line A-A of the lenslet array 124 overlying the display panel 118 such that the lenslet array 124 overlies the display surface 130 of the display panel 118 so as to be disposed between the display surface 130 and the corresponding eye 132 of the user. In this configuration, each lenslet 126 focuses a corresponding region of the display surface 130 onto the pupil 134 of the eye, with each such region at least partially overlapping with one or more adjacent regions. Thus, in such computational display configurations, when an array 120 of elemental images 122 is displayed at the display surface 130 of the display panel 118 and then viewed by the eye 132 through the lenslet array 124, the user perceives the array 120 of elemental images 122 as a single image of a scene. Thus, when this process is performed in parallel for both the left eye and right eye of the user with the proper parallax implemented therebetween, the result is the presentation of autostereoscopic three-dimensional (3D) imagery to the user with the relatively wide FOV and shallow form factor often provided by such computational displays.

As also shown in FIG. 1, the rendering component 104 includes a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 comprising executable instructions for a lightfield frame rendering process, as described below, as well as an eye tracking program 146 comprising executable instructions for an eye tracking process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 136 uses the rendering information 148 to send drawing instructions to the GPUs 138, 140, which in turn utilize the drawing instructions to render, in parallel, a series of lightfield frames 151 for display at the left-eye display 110 and a series of lightfield frames 153 for display at the right-eye display 112 using any of a variety of well-known VR/AR computational/lightfield rendering processes. As part of this rendering process, the CPU 136 may receive pose information 150 from an inertial management unit (IMU) 154, whereby the pose information 150 is representative of a pose of the display sub-system 102 and control the rendering of one or more pairs of lightfield frames 151, 153 to reflect the viewpoint of the object or scene from the pose.

As described in detail below, the rendering component 104 further may use eye pose information from one or both of the eye tracking components 106, 108 to either or both of: shift the position of the array 120 of elemental images 122 within a lightfield frame to be displayed; or scale the sizes of the elemental images 122 of the lightfield frame to be displayed, and thereby effectively shifting the position of the eyebox for the lightfield frame so displayed. To this end, the eye tracking components 106, 108 each may include one or more infrared (IR) light sources (referred to herein as "IR illuminators) to illuminate the corresponding eye with IR light, one or more imaging cameras to capture the IR light reflected off of the corresponding eye as a corresponding eye image (eye image information 156), one or more mirrors, waveguides, beam splitters, and the like, to direct the reflected IR light to the imaging cameras, and one or more processors to execute the eye tracking program 146 so as to determine a current position, current orientation, or both (singularly or collectively referred to herein as "pose") of the corresponding eye from the captured eye image. Any of a variety of well-known eye tracking apparatuses and techniques may be employed as the eye tracking components 146, 148 to track one or both eyes of the user, an example of which is described below with reference to FIG. 5. Alternatively, example configurations for the optical components of the eye tracking components 106, 108 with improved performance are described below with reference to FIGS. 6-10.

In at least one embodiment, the near-eye display system 100 may determine the eye pose as a past eye pose, a current eye pose, or a predicted (future) eye pose, or a combination thereof. In particular, a prediction of a future eye pose may provide improved performance or response time, and any of a variety of eye-movement prediction algorithms may be implemented to predict a future eye pose. Moreover, in some instances, the eye-tracking components 106, 108 may utilize scene information (e.g., location of faces within the imagery to be rendered or saliency heuristics) as input in prediction of a future gaze of the user's eyes for eye pose calculation. As such, the term "eye pose", as used herein, may refer to a previous, current, or predicted eye pose, or some combination thereof.

In a conventional computational display-based near-eye system, the locations at which each of the elemental images in displayed at a display panel is fixed (that is, the position of the array of elemental images is fixed and the same for each lightfield frame displayed), which in turn results in the position of the corresponding eyebox for the computational display likewise being fixed. As a result, if the position or orientation of an eye of the user falls outside of the boundaries of this fixed eyebox, the user's perception of the displayed imagery often is impacted, such as through clipping or vignetting of the imagery, or through loss of focus.

As described herein, in at least one embodiment the near-eye display system 100 mitigates the impact of non-optimal user eye pose on eyebox constraints by effectively "shifting" the position of the eyebox to more closely align with the pose of the user's eye. This is accomplished by using the eye tracking components 106, 108 to track one or both eyes of the user so as to determine the pose of one or both of the eyes for a corresponding lightfield frame to be displayed. With the pose determined, the rendering component 104 then shifts the positions of the elemental images 122 within a lightfield frame being rendered in a corresponding direction relative to a default position when displayed at the corresponding display panel 118. This shift in the position of the array 120 of elemental images 122 with respect to the display surface 130 of the display panel 118 has the effect of shifting the viewing angle of the array 120 relative to the lenslet array 124, and thus has the effect of shifting the position of the eyebox. In addition to, or instead of, shifting the positions of the elemental images, the rendering component 104 may scale the dimensions of the elemental images 122 within the lightfield frame responsive to a Z-axis component of the pose of the user's eye so as to attempt to maintain a constant size of the represented imagery in the virtual plane irrespective of Z-position of the eye pose. In this manner, the position of the eyebox may be dynamically adjusted to better accommodate the pose of the user's eye.

Figure 2:
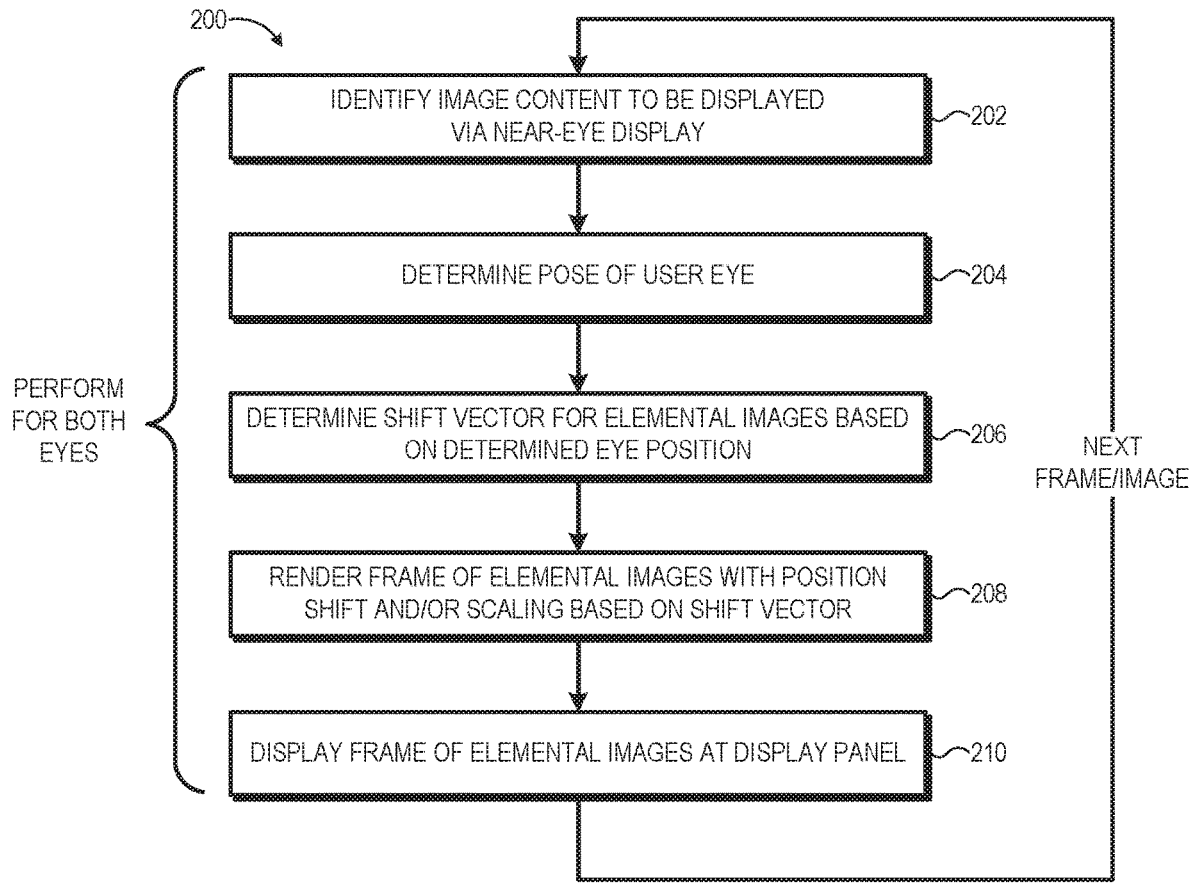
FIG. 2 is a flow diagram illustrating a method for dynamic eyebox adjustment in the near-eye display system of FIG. 1 in accordance with some embodiments.
Figure 3:
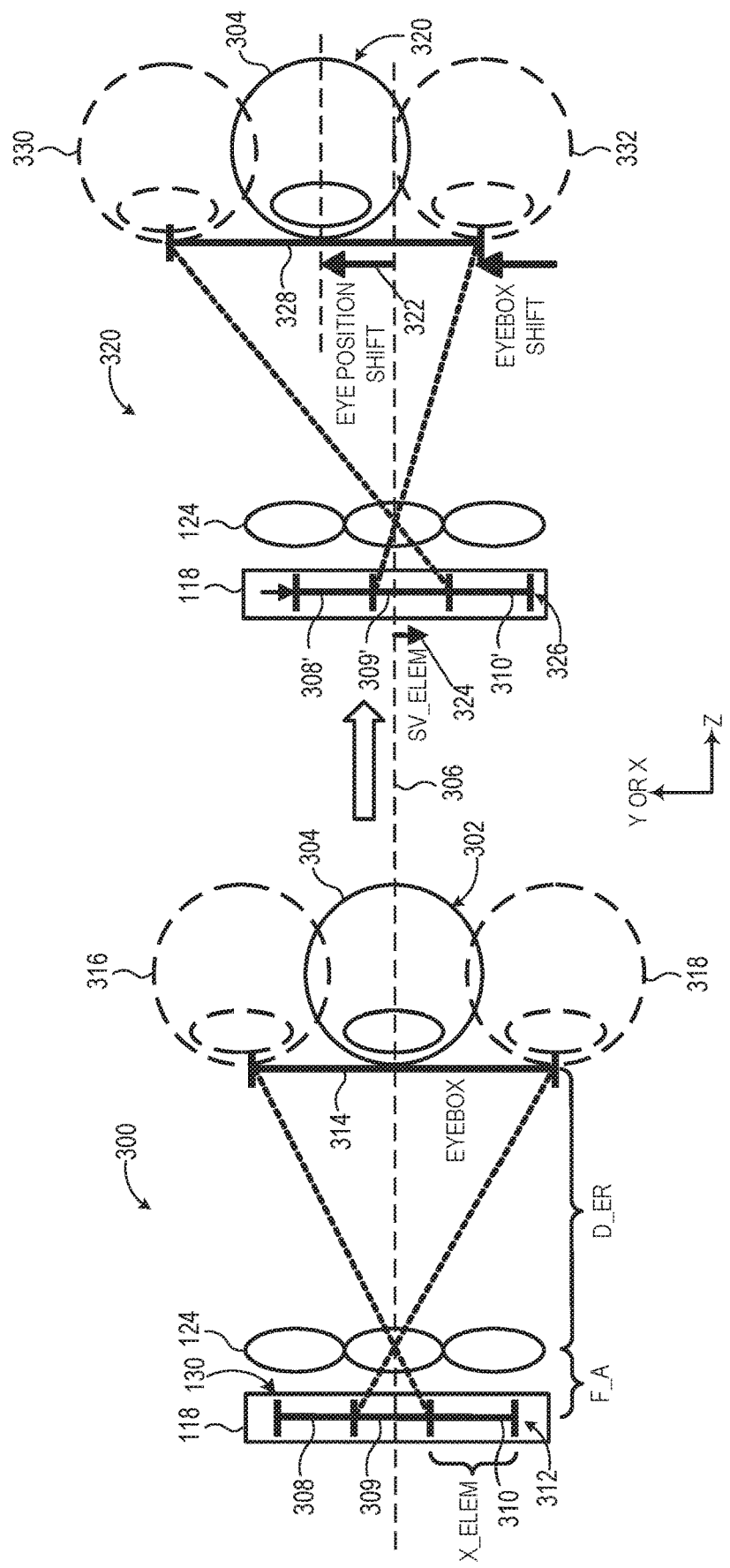
FIG. 3 is a diagram illustrating an example of dynamic eyebox adjustment based on eye pose in accordance with some embodiments.

FIG. 2 illustrates a method 200 of operation of the near-eye display system 100 for rendering lightfield frames with adjusted positioning to provide dynamic eyebox position adjustment in accordance with some embodiments. To facilitate understanding, method 200 is described below with frequent reference to example scenarios illustrated by FIG. 3. The method 200 illustrates one iteration of the process for rendering and displaying a lightfield frame for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user.

For a lightfield frame to be generated and displayed, method 200 starts at block 202, whereby the rendering component 104 identifies the image content to be displayed to the corresponding eye of the user as a lightfield frame. In at least one embodiment, the rendering component 104 receives the IMU information 152 representing data from various pose-related sensors, such as a gyroscope, accelerometer, magnetometer, Global Positioning System (GPS) sensor, and the like, and from the IMU information 150 determines a pose of the apparatus 114 (e.g., HMD) used to mount the displays 110, 112 near the user's eyes. From this pose, the CPU 136, executing the rendering program 144, can determine a corresponding current viewpoint of the subject scene or object, and from this viewpoint and graphical and spatial descriptions of the scene or object provided as rendering information 148, determine the imagery to be rendered for the pose.

At block 204, the CPU 136, executing eye tracking program 146, determines the pose of the corresponding eye of the user. As explained herein, the pose of an eye may be determined using any of a variety of eye tracking techniques. Generally, such techniques include the capture of one or more images of IR light reflected from the pupil and cornea of the eye. The eye tracking program 146 then may manipulate the CPU 136 or the GPUs 138, 140 to analyze the images to determine the pose of the eye based on the corresponding position of one or both of the pupil reflection or corneal reflection. Further, the orientation of the pupil relative to the cornea in turn may be used to determine the orientation of the eye (that is, the direction of gaze of the eye). It should be noted that although block 204 is illustrated in FIG. 2 as being subsequent to block 202, the process of block 204 may be performed before, during, or after the process of block 202.

With the pose of the user's eye determined, at block 206 the rendering program 144 manipulates the CPU 136 to determine a shift vector, denoted "SV_ELEM" herein, based on the pose of the user's eye. As explained above, the shift vector SV_ELEM represents the shift in position to be applied to elemental images within a lightfield frame to be rendered so as to compensate for a corresponding shift in the pose of the user's eye. In particularly, the compensatory shift represented by the shift vector is intended to situate, in effect, the eyebox of the computational display around the eye at its pose so that the eye is relatively centered in the region represented by the eyebox. That is, the shift vector is to serve to dynamically shift the eyebox to match the pose of the eye.

In at least one embodiment, the calculation of the shift vector SV_ELEM is based on an assumption or specification of a default pose of the user's eye and a corresponding default position for the array 120 of elemental images 122 with reference to the display surface 130. To illustrate, referring to an example scenario illustrated by cross-section view 300 of FIG. 3, a default pose 302 for a user's eye 304 relative to the corresponding display panel 118 may be set or defined as centered in the X-Y plane relative to the display surface 130 (that is the viewing axis of the eye 304 is aligned with a center axis 306 of the display surface 130) and located at an assumed, or default, distance from the display surface 130 or lenslet array 124 along the Z-axis. With the eye 304 in this default pose 302, the default position for an array 120 of elemental images 122 of a lightfield frame likewise may be defined as centered relative to the display surface 130. To illustrate, in cross-section view 300, a lightfield frame is composed of a 3×3 array of elemental images, whereby the three elemental images present in the cross-section view 300 being represented by regions 308, 309, 310 of the display panel 118, and these regions 308, 309, 310 have the illustrated default position 312 centered about the center axis 306 when the eye 304 is in the default pose 302 (which, in this example, is centered along the axis 306 at a specified distance from the lenslet array 124).

With this example 3×3 elemental image configuration (and corresponding 3×3 lenslet array configuration), the corresponding eyebox has a dimension in the plane parallel to the display surface 130 as represented by the vertical line 314. That is, so long as the eye 304 is positioned between pose 316 and pose 318 at that same distance from the display surface 130, the user should have an unclipped or non-occluded view of the elemental image displayed at region 309. However, the example scenario depicted in FIG. 3 exaggerates the size of the eyebox relative to the display panel 118. In a typical configuration with a much larger number of elemental images, a much larger number of lenslets, and a greater distance of the eye from the display panel, the eyebox is likely to be much smaller relative to the display panel 118, such that even slight movements or deviations of the user IPD from a default IPD range may cause the user's eye to fall outside of the eyebox and thus impact the user's view of the lightfield frame being displayed.

With this default pose 302 for the eye 304 and corresponding default position 312 for a lightfield frame so defined or otherwise set, the rendering component 104 can determine the shift vector SV_ELEM as relative to the default position 312 and based on the change from the default pose 302 represented by the pose of the eye 304. To illustrate, cross-section view 320 illustrates an example scenario whereby the eye tracking component 106 has tracked the eye 304 and determined, at block 204, that its pose is at position 320, which represents a shift upward from the default pose 304 centered about the central axis 306 (this shift being represented by arrow 322). To compensate for this upward shift in the position of the eye 304, at block 206 the rendering component 104 determines a compensatory shift vector SV_ELEM (represented by arrow 324) in the opposite direction, that is, downward in the orientation of FIG. 3.

In at least one embodiment, the rendering component 104 determines the shift vector SV_ELEM based on the following expression:

$$SV\_ELEM = -EYE\_SHIFT \times (F\_A/D\_ER)$$

where SV_ELEM represents the shift vector, EYE_SHIFT represents the eye pose shift in vector form, F_A represents the focal length of the lenslets 126 (that is, the distance between the display surface 1308 and the plane of the lenslets 126), and D_ER represents the eye relief (that is, the distance between the plane of the lenslets 126 and the eye 304). Note that in a situation in which the eye 304 is posed at the default pose, the term EYE_SHIFT would be zero, and thus the shift vector SV_ELEM likewise would be zero (i.e., no shift). Note that while the above description is directed to an implementation in which all of the elemental images are shifted by the same degree or amount, in other implementations the shifting of positions of the elemental images may differ between elemental images; that is, different elemental images may have different position shifts, such as to accommodate for different perspective shifts (e.g., parallax shift).

In some instances, the shift in eye pose from the default pose may include a shift in the Z-direction. In such instances, at block 206 the rendering component 104 also determines the amount of scaling (or magnification) to apply to the elemental images of the lightfield frame to be rendered. To illustrate, x_elem, which represents the size of an elemental image to be rendered in the x dimension (x=X or Y) may be determined by the expression:

$$x\_elem = D\_A \times (1 + F\_A/D\_ER)$$

Referring back to FIG. 2, with the shift vector SV_ELEM determined and scaling of the elemental images determined, as appropriate, at block 208 the rendering program 144 manipulates the CPU 136 to instruct the corresponding one of the GPUs 138, 140 to render a lightfield frame with array 120 using the image content identified at block 202, whereby the lightfield frame includes an array of elemental images. As part of this process, the CPU 136 provides the shift vector SV_ELEM and indication of any scaling to be applied to the dimensions of the elemental images to the GPU and instructs the GPU to render the lightfield frame such that the elemental images are shifted relative to their default positions within the frame by the shift vector SV_ELEM and scaled in accordance with the supplied scaling information, if any. The GPU thus renders the lightfield frame with the shifted and/or scaled array of elemental images and at block 210 the GPU provides the lightfield frame to the corresponding one of the computational displays 110, 112 for display to the eye 304 of the user.

To illustrate, turning again to FIG. 3, when the GPU implements the shift vector SV_ELEM represented by arrow 324, the resulting array of elemental images is shifted downward relative to the frame or the display surface 130 into a shifted position 326 so that the three elemental images shown in the cross-section view 320 are displayed at shifted portions 308', 309', and 310'. The resulting eyebox (represented by vertical line 328) is thus effectively shifted upward relative to the eyebox presented at the default pose 302 so that is it generally centered on the pose 320 of the eye 304, and thus enabling the eye 304 to move anywhere between pose 330 and pose 332 without vignetting or other obfuscation of the displayed imagery. Noting that pose 330 is outside of the original eyebox, it will be appreciated that this dynamic shifting of the eyebox via complementary shifting of the elementary images of the displayed lightfield frame permits greater variation in eye position and orientation than otherwise would be achievable with a fixed eyebox.

FIG. 4 illustrates additional example complementary shifting of the elementary images of a displayed lightfield to facilitate dynamic eyebox shifting in accordance with some embodiments. As shown by view 402, the pose of an eye 404 is at a default pose relative to the display panel 118 and thus an array 406 of elemental images 408 are rendered at a default position within the lightfield frame. However, as illustrated by view 410, a shift of the pose of the eye 404 to the right of the default pose results in a complementary shift in the position of the array 406 to the left of the default position within a lightfield frame. Likewise, as shown by view 412, a shift of the pose of the eye 404 upward results in a complementary shift downward for the array 406 from the default position within a lightfield frame. The shift in pose of the eye 304 is not limited to shifts in a single cardinal direction, nor is the corresponding shift in the position of the array 406. For example, view 414 illustrates that a shift in the pose of the eye to the right and downward from the default pose results in a complementary shift in the position of the array 406 upward and to the left within a lightfield frame. These shifts in positions of the array 406 also may be accompanied by magnification or other scaling of the elemental images 408 within the array responsive to shifts of the eye 404 from a default position along the Z-axis.

Note that because the dynamic eyebox process described results in shifting of the array 120 of elemental images within a near-eye lightfield frame depending on the pose of the user's eye, the near-eye lightfield frame typically utilizes a small buffer zone surrounding the array 120 in its default, or centered, position so as to permit the position of the array 120 to be shifted in any of a variety of directions without clipping of elemental images. This buffer zone typically is relatively modest given the magnification term of the lenslets 126, and generally constitutes only a very small portion of the overall display surface 130. Alternatively, in other embodiments the buffer zone may be excluded and the elemental images on the leading edge may be permitted to clip when a shift in the position of the array 120 is implemented.

Further, a change in the orientation of the eye may trigger a corresponding shift in the position of the elemental images in addition to, or instead of, a change in the position of the eye. As the types of near-eye lightfield displays contemplated herein typically are insensitive to gaze direction, changes in eye orientation may be handled in the same manner described herein with respect to changes in eye position. That is, the dynamic eyebox shifting process described herein may be effectively applied to any aspect of the eye pose (that is, eye orientation, eye position, or combination thereof).

As explained above, the dynamic eyebox shifting process described herein utilizes an eye tracking component (e.g., eye tracking components 106, 108) to determine the pose of a corresponding eye. This eye tracking component typically includes one or more IR illuminators to illuminate the eye, an imaging camera to capture imagery of IR reflections from the eye, one or more lenses, waveguides, or other optical elements to guide the reflected IR light from the eye to the imaging camera, and one or more processors executing a software program to analyze the captured imagery.

Figure 5:
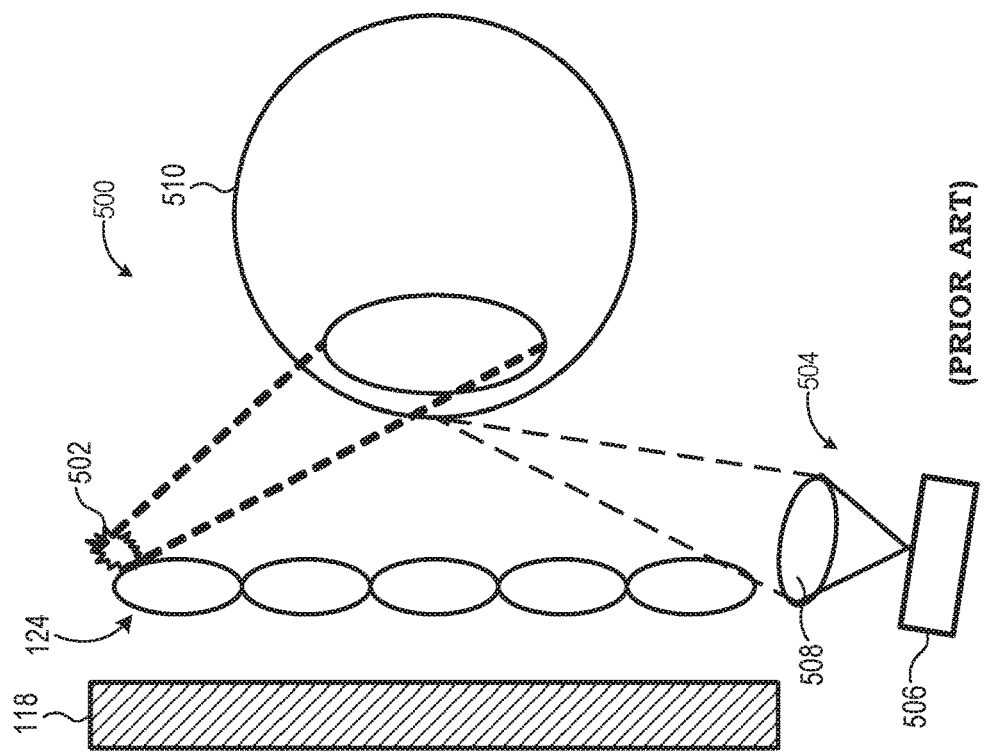
FIG. 5 is a diagram illustrating a conventional oblique-angle configuration for eye tracking in a near-eye display system.

FIG. 5 illustrates a conventional configuration for the optical components of an eye tracking component that may be utilized as an eye tracking component in the near-eye display system 100. As illustrated by the cross-section view 500, in this conventional approach an IR illuminator 502 is disposed at or near with the corresponding lenslet array 124 at one end of the lenslet array 124 while an image capture assembly 504 comprising an imaging camera 506 and one or more lenses 508 or other optical elements are disposed at the other end of the lenslet array 124 such that the IR illuminator 502 and the image capture assembly 504 are not within the FOV of the eye 510 with respect to the display panel 118 as viewed through the lenslet array 124, and thus do not interfere with the viewing of the display panel 118. In operation, the IR illuminator 502 illuminates the eye 510 with IR light, and a reflection of this IR light off of the eye 510 is captured as one or more images by the image capture assembly 504. However, the position of the image capture assembly 504 puts the image capture assembly 504 at an oblique angle relative to the eye 510 and the IR reflections, which can prove challenging for eye tracking analysis of any images so captured. One typical solution to this problem is to impose a minimum eye relief so as to reduce the oblique angle, but this results in a thicker form factor than is otherwise necessary, and thus can detract from the user's enjoyment of the display system.

Figure 6:
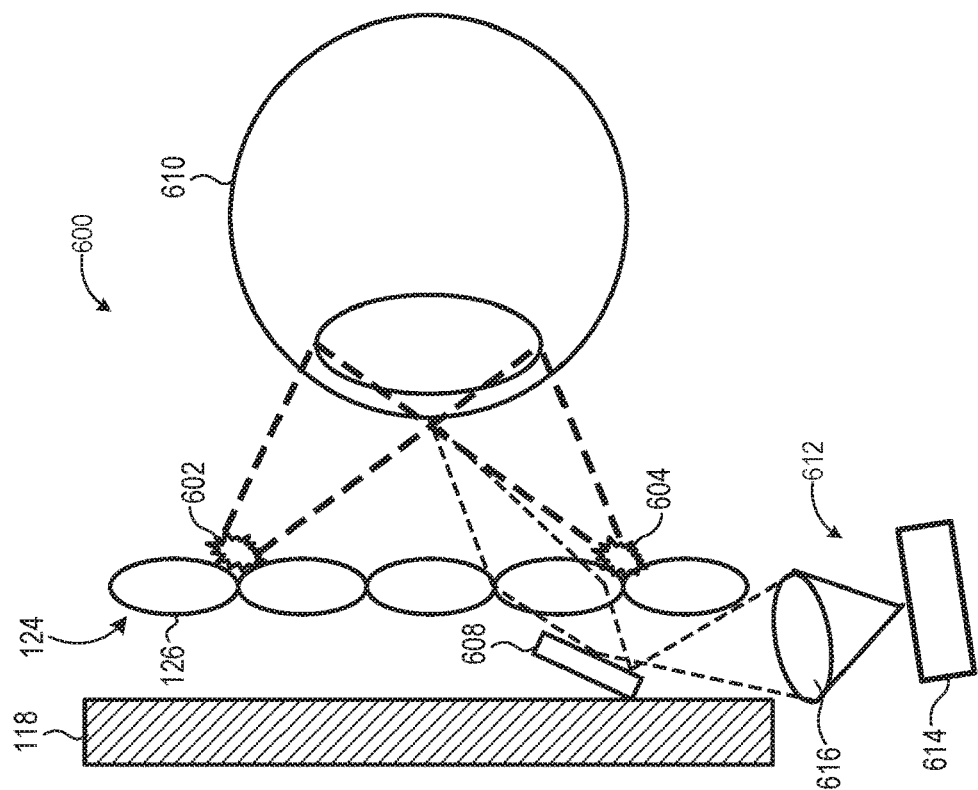
FIG. 6 is a diagram illustrating an example eye tracking component in a near-eye display system in accordance with some embodiments.

FIG. 6 illustrates an improved configuration for the optical components of an eye tracking component that may be utilized in the near-eye display system 100 in accordance with some embodiments. As shown by the cross-section view 600 of FIG. 6, in this configuration one or more IR illuminators, such as IR illuminators 602, 604, are disposed between lenslets 126 of the lenslet array 124 such that the IR light emitted therefrom falls on the eye 610 at a less oblique angle. Further, rather than attempting to capture the reflected IR light directly from the eye 610, the configuration of FIG. 6 employs a flat or curved reflective element 608 (which may comprise an IR reflector/mirror or a beam splitter) disposed between the lenslet array 125 and the display panel 118. An image capture assembly 612 comprising an imaging camera 614 and one or more lenses 616 or other optical elements is focused on the reflective element 608. In this approach, IR light reflected from the eye 610 is focused by one or more adjacent lenslets 126 of the lenslet array 124 onto the reflective element 608, which in turn reflects this incident IR light toward the image capture assembly 612 for capture as one or more images. Thus, in this approach the IR light captured for the imagery is obtained from a less oblique angle than that captured in the conventional configuration illustrated by FIG. 5, and thus facilitating more accurate eye tracking while maintaining the image capture assembly 612 at the periphery of the user's vision. Note that while a single image capture assembly 612 is depicted in the example of FIG. 6, in other embodiments multiple image capture assemblies 612 at the periphery of the lenslet array 124 may be used to capture reflected IR imagery of the eye 610 from different viewpoints for increased eye tracking accuracy.

It will be appreciated that the reflective element 608 is within the FOV of the eye 610. However, because it is disposed between the display panel 118 and the lenslet array 124 (i.e., is closer than the focal length of the lenslets 126), the reflective element 608 will be out of focus to the eye 610. Nevertheless, the reflective element 608 will obscure the eye's view of the one or more elemental images disposed behind the reflective element 608. However, as described in greater detail below with reference to FIG. 9, because the computational display is, in effect, an array of overlapping projectors, the intensity of the non-obscured overlapping projectors can be used to computationally compensate for the obscured elemental image(s).

Figure 7:
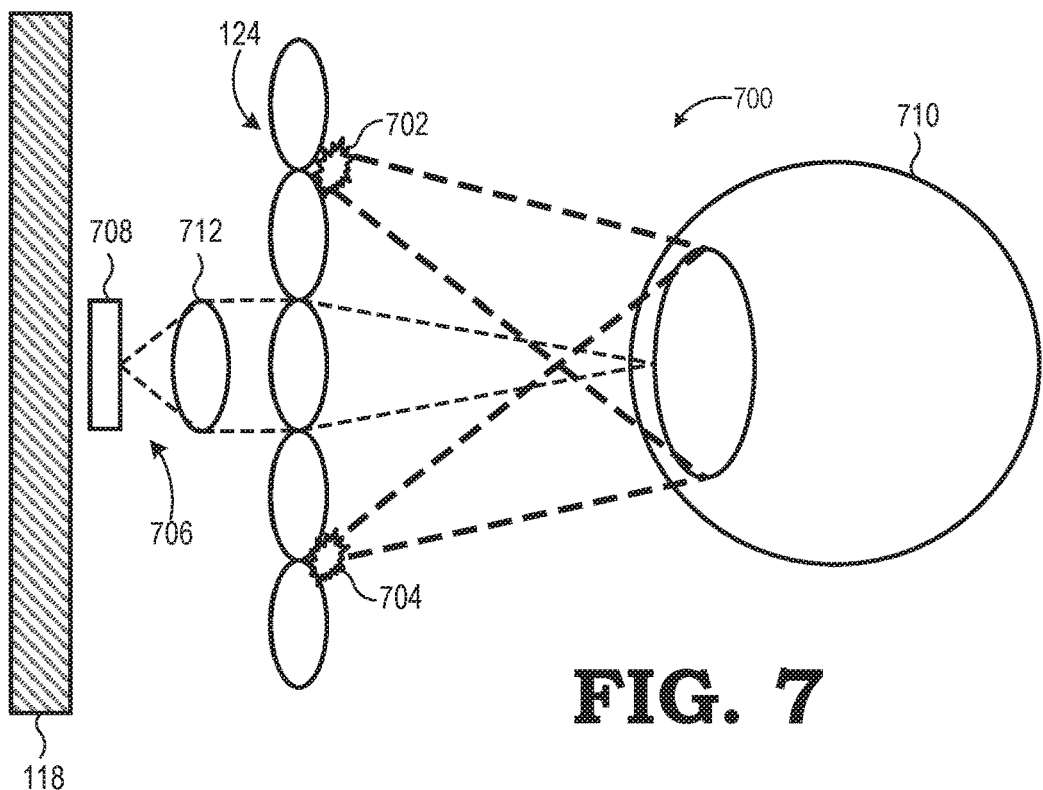
FIG. 7 is a diagram illustrating another example eye tracking component in a near-eye display system in accordance with some embodiments.

FIG. 7 illustrates another improved configuration for the optical components of an eye tracking component that may be utilized in the near-eye display system 100 in accordance with some embodiments. As shown by the cross-section view 700, in this configuration one or more IR illuminators, such as IR illuminators 702, 704, are positioned between lenslets 126 of the lenslet array 124 such that the IR light emitted therefrom falls on the eye 710 at a less oblique angle. Further, rather than redirect reflected IR light from the eye 710 to the periphery for image capture, the configuration of FIG. 7 disposes an image capture assembly 706 between the lenslet array 124 and the display panel 118, with the image capture assembly 706 comprising an imaging camera 708 and one or more lenses 712 or other optical elements is focused toward the eye 710. In this approach, IR light reflected from the eye 610 is focused by an intervening lenslet 126 of the lenslet array 124 directly onto (that is, without reflecting) the imaging camera 708 via the one or more optical elements of the image capture assembly. Thus, in this approach the image capture assembly 708 has a direct, or acute angle, view of the pupil and cornea of the eye 710, which facilitates highly accurate eye tracking. Note that while a single image capture assembly 706 is depicted in the example of FIG. 7, in other embodiments multiple image capture assemblies 706 disposed between the lenslet array 124 and the display panel 118 may be used to capture reflected IR imagery of the eye 610 from different viewpoints for increased eye tracking accuracy. Further, as with the configuration of FIG. 6, the presence of the imaging camera assembly 706, while out of focus to the eye 710, will obscure the elemental image behind the imaging camera assembly 706. However, due to the overlapping projector effect, the luminosity of at least portions of one or more adjacent elemental images may be selectively increased through computational methods so as to compensate for the obscured elemental image, as described below.

Figure 8:
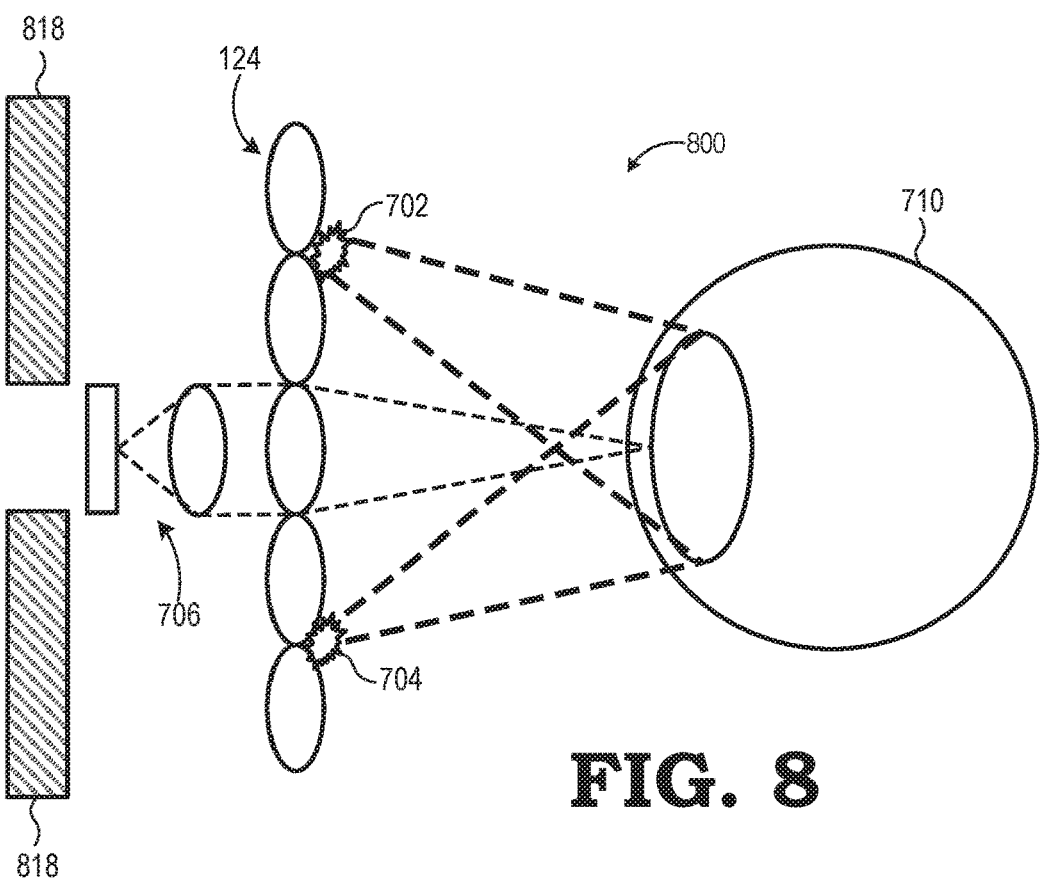
FIG. 8 is a diagram illustrating a variation of the configuration of an eye tracking component of FIG. 7 in accordance with some embodiments.

FIG. 8 illustrates a modification to the configuration of FIG. 7 in which, as illustrated by cross-section view 800, rather than employing a single display panel 118, multiple tiled display panels 818 are utilized to form an effective larger display panel. In this approach, the tiled display panels 818 are separated so that the imaging camera assembly 706 is positioned in a gap between display panels 818, and thus keeping the imaging camera assembly 706 from obscuring one or more elemental images from the view of the eye 710.

The eye tracking component configurations illustrated by FIGS. 6-8 have the benefit of providing a less oblique or more direct viewpoint of the pupil and cornea of the eye, and thus facilitating improved eye tracking accuracy. However, these configurations also place elements between the eye and the display panel, and thus obscuring the eye's view of one or more of the elemental images displayed at the display panel. The rendering component 104 can compensate for the one or more obscured elemental images by leveraging the overlapping projector nature of a near-eye lightfield display, such as the computational displays contemplated herein.

Figure 9:
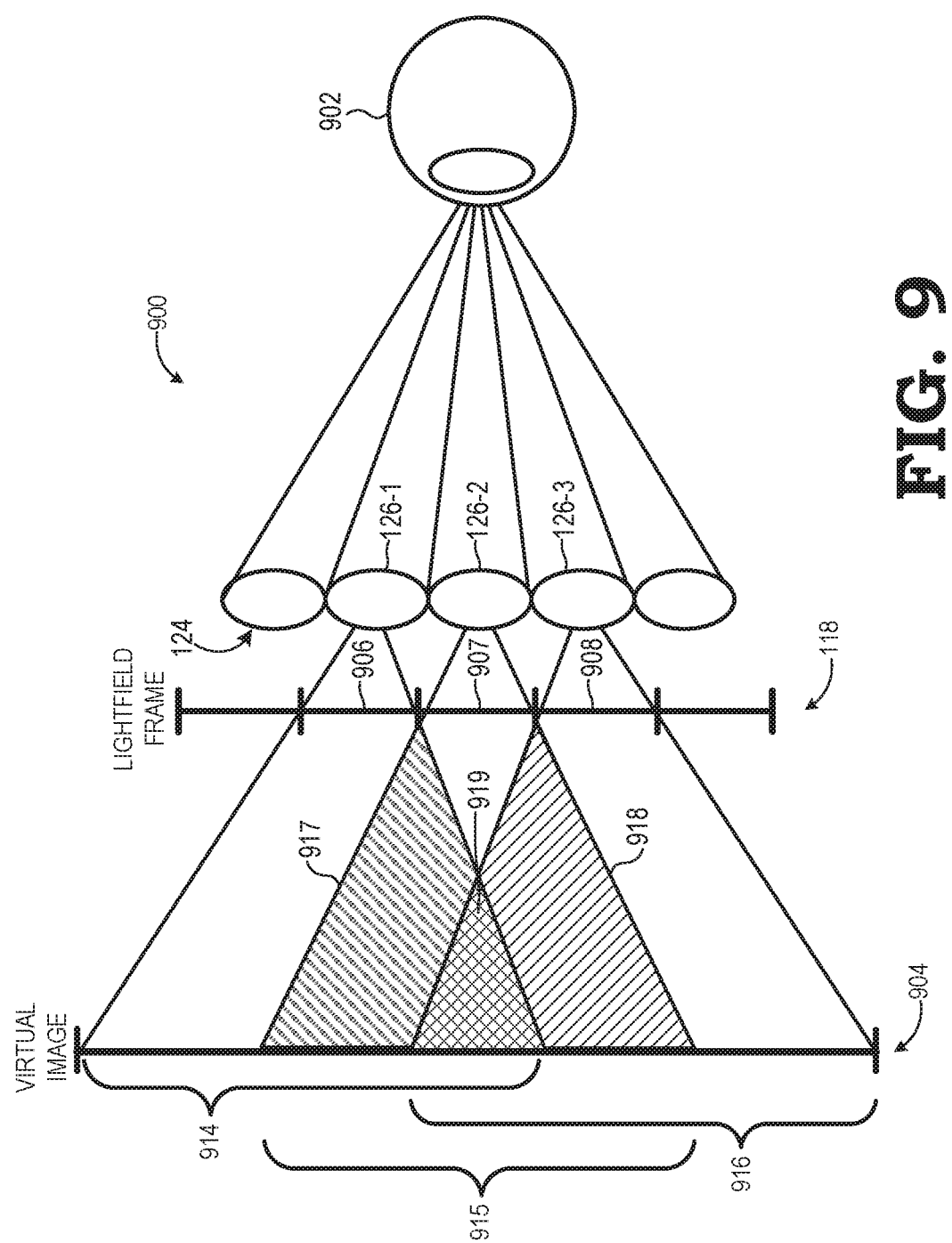
FIG. 9 is a diagram illustrating a method for compensating for an obscured elemental image in a near-eye lightfield display due to a component of an eye tracking component in accordance with some embodiments.

To illustrate, FIG. 9 depicts a cross-section view 900 of a computational display such as the ones utilized in the near-eye display system 100. As shown in this view, each of the lenslets 126 of the lenslet array 124 serves as a separate "projector" onto the eye 902, with each "projector" overlapping with one or more adjacent projectors in forming a composite virtual image 904 from the array of elemental images displayed at the display panel 118. To illustrate, the lenslet 126-1 projects a corresponding elemental image (represented by region 906) onto region 914 of the virtual image 904, the lenslet 126-2 projects a corresponding elemental image (represented by region 907) onto region 915 of the virtual image 904, and the lenslet 126-3 projects a corresponding elemental image (represented by region 908) onto region 916 of the virtual image 904. As further shown by FIG. 9, regions 914 and 915 overlap in sub-region 917, regions 916 and 916 overlap in sub-region 918, and all three regions 914, 915, 916 overlap in sub-region 919.

Thus, assuming in this example that the elemental image positioned at region 907 of the display panel 118 is obscured from the eye 902 due to an image capture apparatus disposed between the region 907 and the lenslet array 124, the intensity of one or more of the surrounding elemental images may be computationally increased to compensate for the loss of intensity caused by the obscured elemental image of region 907. For example, in the illustrated plane, the elemental images at regions 906 and 908 may be increased in brightness, as may other adjacent elemental images in other planes of direction of the display panel 118, so as to computationally compensate or the obscured elemental image at region 907. Note that FIG. 9 illustrates a simplified example with overlapping regions with only the immediately adjacent elemental images. In many implementations, elemental images other than those immediately adjacent to the obscured elemental image may have regions of pixels that overlap with the obscured pixels in the obscured elemental image. Thus, in general, the computational compensation for an obscured elemental image includes identifying which pixels in the obscured elemental image are replicated in surrounding elemental images and then scaling the intensity of the replicated (that is, overlapped) pixels within the surrounding elemental images by the fraction (N+1)/N, where N represents the number of elemental images sharing that pixel.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a near-eye display system, a method comprising:
    determining, using an eye tracking component of the near-eye display system, a first pose of a user's eye;
    determining a shift vector for an array of elemental images forming a near-eye lightfield frame based on the first pose of the user's eye, wherein determining the first pose of the user's eye comprises capturing imagery of the user's eye using an imaging camera;

rendering the array of elemental images at a position within the near-eye lightfield frame that is based on the shift vector; and displaying the near-eye lightfield frame at multiple tiled display panels of the near-eye display system, wherein a reflective element is disposed between a lenslet array and the multiple display panels and the reflective element is oriented so as to reflect IR light reflected from the user's eye toward the imaging camera, and an array of overlapping projectors is configured to compensate for images obscured by the reflective element.

2. The method of claim 1, wherein determining the shift vector comprises:

determining a shift from a default pose for the user's eye represented by the first pose; and determining the shift vector as representing a shift from a default position for the array of elemental images within the near-eye lightfield frame based on the shift from the default pose for the user's eye.

3. The method of claim 2, wherein determining the shift vector comprises determining the shift vector based on an equation:

$$SV\_ELEM = -EYE\_SHIFT \times (F\_A/D\_ER)$$

whereby SV_ELEM represents the shift vector, EYE_SHIFT represents the shift from the default pose for the user's eye, F_A represents a focal length of lenslets of the lenslet array overlying the multiple tiled display panels, and D_ER represents a distance between the lenslet array and the user's eye.

4. The method of claim 1, further comprising:

determining a position of the user's eye along an axis perpendicular to the multiple tiled display panels; and scaling a size of the elemental images of the array based on the position.

5. In a near-eye display system, a method comprising:

determining, at a first time, a first pose of a user's eye relative to multiple tiled display panels of the near-eye display system using an eye tracking component of the near-eye display system;

rendering and displaying a first near-eye lightfield frame comprising a first array of elemental images, wherein the first array has a first position within the first near-eye lightfield frame that is based on the first pose of the user's eye;

determining, at a second time, a second pose of the user's eye relative to the multiple tiled display panels using the eye tracking component, the second pose different than the first pose, wherein determining the first pose of the user's eye and determining the second pose of the user's eye comprises capturing imagery of the user's eye using an imaging camera; and rendering and displaying a second near-eye lightfield frame comprising a second array of elemental images, wherein the second array has a second position within the second near-eye lightfield frame that is based on the second pose of the user's eye, the second position different than the first position, wherein a reflective element is disposed between a lenslet array and the multiple display panels, the reflective element being oriented so as to reflect IR light reflected from the user's eye toward the imaging camera and an array of overlapping projectors is configured to compensate for images obscured by the reflective element.

6. The method of claim 5, wherein:

the first pose is a default pose and the first position is a default position; and rendering and displaying the second near-eye lightfield frame comprises:

determining a shift from the default pose represented by the first pose;

determining a shift vector based on the shift from the default pose for the user's eye; and determining the second position as a shift from the first position based on the shift vector.

7. The method of claim 6, wherein determining the shift vector comprises determining the shift vector based on an equation:

$$SV\_ELEM = -EYE\_SHIFT \times (F\_A/D\_ER)$$

whereby SV_ELEM represents the shift vector, EYE_SHIFT represents the shift from the default pose for the user's eye, F_A represents a focal length of lenslets of the lenslet array overlying the multiple tiled display panels, and D_ER represents a distance between the lenslet array and the user's eye.

8. A near-eye display system comprising:

multiple tiled display panels to display a near-eye lightfield frame comprising an array of elemental images;

an eye tracking system to track a pose of a user's eye;

a rendering system to position the array of elemental images within the near-eye lightfield frame based on the pose of the user's eye; and a reflective element disposed between a lenslet array and the multiple display panels, the reflective element being oriented so as to reflect IR light reflected from the user's eye toward the imaging camera and an array of overlapping projectors is configured to compensate for images obscured by the reflective element.

9. The near-eye display system of claim 8, wherein the rendering system is to position the array of elemental images within the near-eye lightfield frame by:

determining a shift vector based on the pose of the user's eye; and shifting a position of the array of elemental images within the near-eye lightfield frame from a default position based on the shift vector.

10. The near-eye display system of claim 9, wherein the rendering system is to determine the shift vector by:

determining a shift from a default pose for the user's eye represented by the tracked pose of the user's eye; and determining the shift vector based on the shift from the default pose for the user's eye.

11. The near-eye display system of claim 9, wherein the rendering system is to determine the shift vector based on an equation:

$$SV\_ELEM = -EYE\_SHIFT \times (F\_A/D\_ER)$$

whereby SV_ELEM represents the shift vector, EYE_SHIFT represents the shift from the default pose for the user's eye, F_A represents a focal length of lenslets of the lenslet array overlying the multiple tiled display panels, and D_ER represents a distance between the lenslet array and the user's eye.

12. The near-eye display system of claim 8, wherein the eye tracking system comprises:

a set of one or more infrared (IR) illuminators to project light onto the user's eye.

13. A rendering system comprising:

at least one processor;

an input node to receive data from an eye tracking system, the data indicating a pose of a user's eye relative to a near-eye multiple tiled display panels; and a memory to store a set of executable instructions, the set of executable instructions configured to manipulate the at least one processor to render a near-eye lightfield frame comprising an array of elemental images having a position within the near-eye lightfield frame based on the pose of the user's eye, wherein a reflective element is disposed between a lenslet array and the multiple display panels, the reflective element being oriented so as to reflect IR light reflected from the user's eye toward the imaging camera and an array of overlapping projectors is configured to compensate for images obscured by the reflective element.

14. The rendering system of claim 13, wherein the set of executable instructions are configured to manipulate the at least one processor to render the near-eye lightfield frame by:
   determining a shift vector based on the pose of the user's eye; and
   shifting a position of the array of elemental images within the near-eye lightfield frame from a default position based on the shift vector.

15. The rendering system of claim 14, wherein the set of executable instructions are configured to manipulate the at least one processor to determine the shift vector by:
   determining a shift from a default pose for the user's eye represented by the tracked pose of the user's eye; and
   determining the shift vector based on the shift from the default pose for the user's eye.

16. The rendering system of claim 15, wherein the set of executable instructions are configured to manipulate the at least one processor to determine the shift vector based on an equation:

$$SV\_ELEM = -EYE\_SHIFT \times (F\_A/D\_ER)$$

whereby SV_ELEM represents the shift vector, EYE_SHIFT represents the shift from the default pose for the user's eye, F_A represents a focal length of lenslets of the lenslet array overlying the multiple tiled display panels, and D_ER represents a distance between the lenslet array and the user's eye.

17. The rendering system of claim 13, wherein the set of executable instructions are configured to manipulate the at least one processor to render the near-eye lightfield frame further by:
   determining a position of the user's eye along an axis perpendicular to the multiple tiled display panels; and
   scaling a size of the elemental images of the array based on the position.

* * * * *